United States Patent
Hastie et al.

(10) Patent No.: US 10,810,228 B2
(45) Date of Patent: Oct. 20, 2020

(54) UNIVERSAL AUTOMATIC DATA UPDATE DETECTION AND PUBLICATION

(71) Applicant: ServiceNow, Inc., Santa Clara, CA (US)

(72) Inventors: Matthew Duncan Hastie, San Diego, CA (US); Jennifer Lee, San Diego, CA (US); Brent Bahry, San Diego, CA (US); Jared Laethem, Carlsbad, CA (US)

(73) Assignee: ServiceNow, Inc., Santa Clara, CA (US)

( * ) Notice: Subject to any disclaimer, the term of this patent is extended or adjusted under 35 U.S.C. 154(b) by 347 days.

(21) Appl. No.: 15/236,683

(22) Filed: Aug. 15, 2016

(65) Prior Publication Data

US 2017/0124171 A1 May 4, 2017

Related U.S. Application Data

(60) Provisional application No. 62/249,708, filed on Nov. 2, 2015.

(51) Int. Cl.
*G06F 16/27* (2019.01)
*G06F 16/23* (2019.01)
(Continued)

(52) U.S. Cl.
CPC ............ *G06F 16/273* (2019.01); *G06F 9/542* (2013.01); *G06F 16/00* (2019.01); *G06F 16/2358* (2019.01)

(58) Field of Classification Search
CPC ......... G06F 17/30578; G06F 17/30368; G06F 16/273; G06F 16/2358; G06F 16/00; G06F 16/27; G06F 9/542; G06G 9/542
See application file for complete search history.

(56) References Cited

U.S. PATENT DOCUMENTS 5,388,255 A * 2/1995 Pytlik ............... G06F 16/24539
5,978,594 A 11/1999 Bonnell
(Continued)

FOREIGN PATENT DOCUMENTS

WO 2008155545 A2 12/2008

OTHER PUBLICATIONS

Hubert Ka Yau Leung: "Subject space", Collaborative Research, IBM Press, Sep. 30, 2002 (Sep. 30, 2002), XP058235477.
(Continued)

*Primary Examiner* — Miranda Le
(74) *Attorney, Agent, or Firm* — Fletcher Yoder PC

(57) ABSTRACT

Universal automatic data update detection and publication may include receiving a request for requested information, which includes an information element associated with a structured data location in a structured data storage unit, identifying a predicate referencing the structured data location, including the predicate in a predicates registry by compiling the predicate into an intermediate representation, creating an asynchronous message bus channel corresponding to the predicate, detecting a data operation for the structured data storage unit, wherein the information element is associated with the data operation, evaluating the intermediate representation, determining a predicate domain change type corresponding to the data operation, generating a change notification including an indication of the change type, and publishing the change notification to the asynchronous message bus channel such that a presentation via the client device is updated in response to the change notification.

16 Claims, 4 Drawing Sheets

(51) Int. Cl.
*G06F 9/54* (2006.01)
*G06F 16/00* (2019.01)

(56) References Cited

U.S. PATENT DOCUMENTS

| | | | | |
|---|---|---|---|---|
| 6,058,391 | A * | 5/2000 | Gardner | G06F 16/284 |
| 6,321,229 | B1 | 11/2001 | Goldman | |
| 6,502,093 | B1 * | 12/2002 | Bhatt | G06F 16/24568 |
| 6,631,363 | B1 * | 10/2003 | Brown | G06F 9/542 |
| | | | | 370/401 |
| 6,816,898 | B1 | 11/2004 | Scarpelli | |
| 6,882,993 | B1 * | 4/2005 | Lawande | G06F 17/30383 |
| | | | | 707/714 |
| 6,895,586 | B1 | 5/2005 | Brasher | |
| 6,925,466 | B2 | 8/2005 | Jensen et al. | |
| 7,027,411 | B1 | 4/2006 | Pulsipher | |
| 7,039,871 | B2 * | 5/2006 | Cronk | G06F 17/30899 |
| | | | | 707/999.004 |
| 7,123,909 | B2 * | 10/2006 | Nakamura | H04W 8/18 |
| | | | | 455/432.3 |
| 7,209,916 | B1 * | 4/2007 | Seshadri | H04L 12/1859 |
| 7,392,300 | B2 | 6/2008 | Knantharangachar | |
| 7,530,077 | B2 * | 5/2009 | Bhogal | G06F 9/542 |
| | | | | 709/202 |
| 7,617,073 | B2 | 11/2009 | Trinon | |
| 7,877,783 | B1 | 1/2011 | Cline | |
| 7,945,860 | B2 | 5/2011 | Vambenepe | |
| 7,987,246 | B2 * | 7/2011 | Tsuji | G06F 17/30902 |
| | | | | 709/203 |
| 8,365,193 | B2 | 1/2013 | Chidambaran et al. | |
| 8,554,750 | B2 | 10/2013 | Rangaranjan | |
| 8,837,711 | B2 * | 9/2014 | Vasquez | H04M 3/5233 |
| | | | | 379/265.01 |
| 8,934,894 | B2 * | 1/2015 | Du | H04W 8/205 |
| | | | | 370/329 |
| 9,015,110 | B2 * | 4/2015 | Bajaria | G06F 17/30312 |
| | | | | 707/609 |
| 9,069,827 | B1 * | 6/2015 | Rath | G06F 17/30557 |
| 9,553,831 | B2 * | 1/2017 | Pignataro | H04L 51/046 |
| 9,696,972 | B2 * | 7/2017 | Ewe | G06F 8/38 |
| 2002/0010911 | A1 * | 1/2002 | Cheng | G06F 8/443 |
| | | | | 717/128 |
| 2002/0174109 | A1 * | 11/2002 | Chandy | G06Q 30/02 |
| 2003/0223408 | A1 * | 12/2003 | Chen | H04L 45/306 |
| | | | | 370/352 |
| 2005/0039107 | A1 * | 2/2005 | Hander | G06F 17/2881 |
| | | | | 715/256 |
| 2006/0047696 | A1 * | 3/2006 | Larson | G06F 16/2393 |
| 2007/0162421 | A1 | 7/2007 | Pang et al. | |
| 2008/0262815 | A1 * | 10/2008 | Tian | G06F 8/20 |
| | | | | 703/13 |
| 2008/0301143 | A1 * | 12/2008 | Kim | H04L 41/0213 |
| 2009/0106216 | A1 * | 4/2009 | Gutlapalli | G06F 16/328 |
| 2010/0235335 | A1 * | 9/2010 | Heman | G06F 16/23 |
| | | | | 707/703 |
| 2012/0263293 | A1 * | 10/2012 | Vasquez | H04M 3/5233 |
| | | | | 379/265.12 |
| 2013/0006664 | A1 * | 1/2013 | Chaliparambil | G06Q 10/10 |
| | | | | 705/3 |
| 2013/0091192 | A1 | 4/2013 | Shafi et al. | |
| 2013/0191500 | A1 | 7/2013 | Shafi et al. | |
| 2014/0122096 | A1 * | 5/2014 | Berry | G16H 10/60 |
| | | | | 705/2 |
| 2014/0195476 | A1 * | 7/2014 | Sxhmidt | G06Q 30/0633 |
| | | | | 707/609 |

OTHER PUBLICATIONS

Alexis Campailla et al.: "Efficient filtering in publish-subscribe systems using binary decision diagrams", ; ACM/IEEE 30th International Conference on Software Engineering, 2008, ICSE '08, Jul. 1, 2001; pp. 443-452, XP058188866.

* cited by examiner

UNIVERSAL AUTOMATIC DATA UPDATE DETECTION AND PUBLICATION

CROSS-REFERENCE TO RELATED APPLICATION(S)

This application claims priority to U.S. Provisional Patent Application No. 62/249,708, filed on Nov. 2, 2015, which is herein incorporated by reference in its entirety.

TECHNICAL FIELD

The present disclosure is generally related to information technology, including computer-implemented methods, systems, and apparatuses to automatically detect and push data updates to data consumers in an electronic computing and communication system.

BACKGROUND

An electronic computing and communication system may include one or more communicating and computing elements, which may, in the course of communicating and computing, alter information concurrent with access of the information by other communicating and computing elements. Accordingly, a method and apparatus for universal automatic data update detection and publication may be advantageous.

SUMMARY

Disclosed herein are aspects of universal automatic data update detection and publication.

According to an implementation, a method is provided for universal automatic data update detection and publication. Universal automatic data update detection and publication may include receiving, at a server, from a client device, a request for requested information, wherein the requested information includes an information element associated with a structured data location in a structured data storage unit, and transmitting a response to the client device, the response including the requested information for presentation via the client device. Universal automatic data update detection and publication may include identifying a predicate referencing the structured data location, including the predicate in a predicates registry, wherein including the predicate in the predicates registry includes compiling the predicate into an intermediate representation, and creating an asynchronous message bus channel corresponding to the predicate. Universal automatic data update detection and publication may include detecting a data operation for the structured data storage unit, wherein the information element is associated with the data operation, and evaluating the intermediate representation in response to detecting the data operation. Universal automatic data update detection and publication may include, on a condition that evaluating the intermediate representation indicates that the predicate matches on the data operation, determining a predicate domain change type corresponding to the data operation, generating a change notification including an indication of the change type, and publishing the change notification to the asynchronous message bus channel, wherein the client device is a subscribing device of the asynchronous message bus channel, such that the presentation via the client device is updated in response to the change notification.

According to an implementation, an electronic computing and communication system is provided for universal automatic data update detection and publication. The electronic computing and communication system for universal automatic data update detection and publication may include a client device and a server device. The client device may be configured to transmit a request for requested information, wherein the requested information includes an information element associated with a structured data location in a structured data storage unit, receive a response to the request for requested information, the response including the requested information, and output a representation of the requested information. The server device may include the structured data storage unit, a record watcher unit, and an asynchronous message bus unit. The server device may be configured to receive the request for requested information, and transmit the response to the request for requested information, in response to receiving the request for requested information. The server device may be configured to identify a predicate referencing the structured data location, in response to receiving the request for requested information, include the predicate in a predicates registry, wherein including the predicate in the predicates registry includes compiling the predicate into an intermediate representation, and create the asynchronous message bus channel, the asynchronous message bus channel corresponding to the predicate. The server device may be configured to detect a data operation for the structured data storage unit, wherein the information element is associated with the data operation, and evaluate the intermediate representation in response to detecting the data operation. The server device may be configured to, on a condition that evaluating the intermediate representation indicates that the predicate matches on the data operation, determine a predicate domain change type corresponding to the data operation, generate the change notification, the change notification including an indication of the predicate domain change type, and publish the change notification to the asynchronous message bus channel. The client device may be configured to receive, via an asynchronous message bus channel, a change notification indicating a change for the requested information, wherein the client device is a subscribing device of the asynchronous message bus channel, and output an updated representation of the requested information in response to receiving the change notification.

According to an implementation, a method is provided for universal automatic data update detection and publication. Universal automatic data update detection and publication may include detecting, by a record watcher unit of a server device, a data operation for a structured data storage unit, evaluating a predicate from a predicates registry in response to detecting the data operation, and, on a condition that the predicate matches on the data operation, publishing, by an asynchronous message bus unit of the server device, a change notification to an asynchronous message bus channel, the change notification including an indication of a predicate domain change type corresponding to the data operation, such that a subscribing device of the asynchronous message bus channel updates a presentation in response to the change notification.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views, and wherein.

DETAILED DESCRIPTION

In an electronic computing and communication system a client device may output, present, or display a representation of information received from a server. Over time, the information displayed may become stale, and may differ from the corresponding information stored at the server. In some embodiments, the client computer may mitigate the risk of displaying stale information by sending subsequent requests for update information, or to determine whether the presented information is stale. For example, the client computer may send a request for currently displayed data in response to input, such as user input, or periodically, which may result in latency, such as where the information stored at the server changes at a point in time temporally between client requests, or undue bandwidth utilization, such as where client requests are sent when the information stored at the sever has not changed.

In some embodiments, universal automatic data update detection and publication may minimize the risk of displaying stale information, with minimal latency and bandwidth utilization. In universal automatic data update detection and publication, the client device may omit sending requests for updated data. Instead, the server may identify a predicate corresponding to the requested information in response to receiving an initial request for the information from the client device. The sever may register the predicate in a predicates registry, and create an asynchronous message bus channel corresponding to the predicate. The client device may be subscribed to the asynchronous message bus channel. The server may detect data operations for a data storage unit including the stored information, may evaluate the predicate registry to determine whether the data operation indicates a change of the information displayed by the client, and may publish a change notification indicating an identified change to the asynchronous message bus channel. The client device may receive the change notification and may update the presentation to include the changed information in response.

The preceding overview is provided to enable a basic or general understanding of various aspects of the non-limiting embodiments that follow and the accompanying drawings. This overview is not intended as an exhaustive or complete description. Instead, the purpose of this overview is to introduce some concepts of this disclosure as a prelude to the following more detailed descriptions of the various embodiments.

Figure 1:
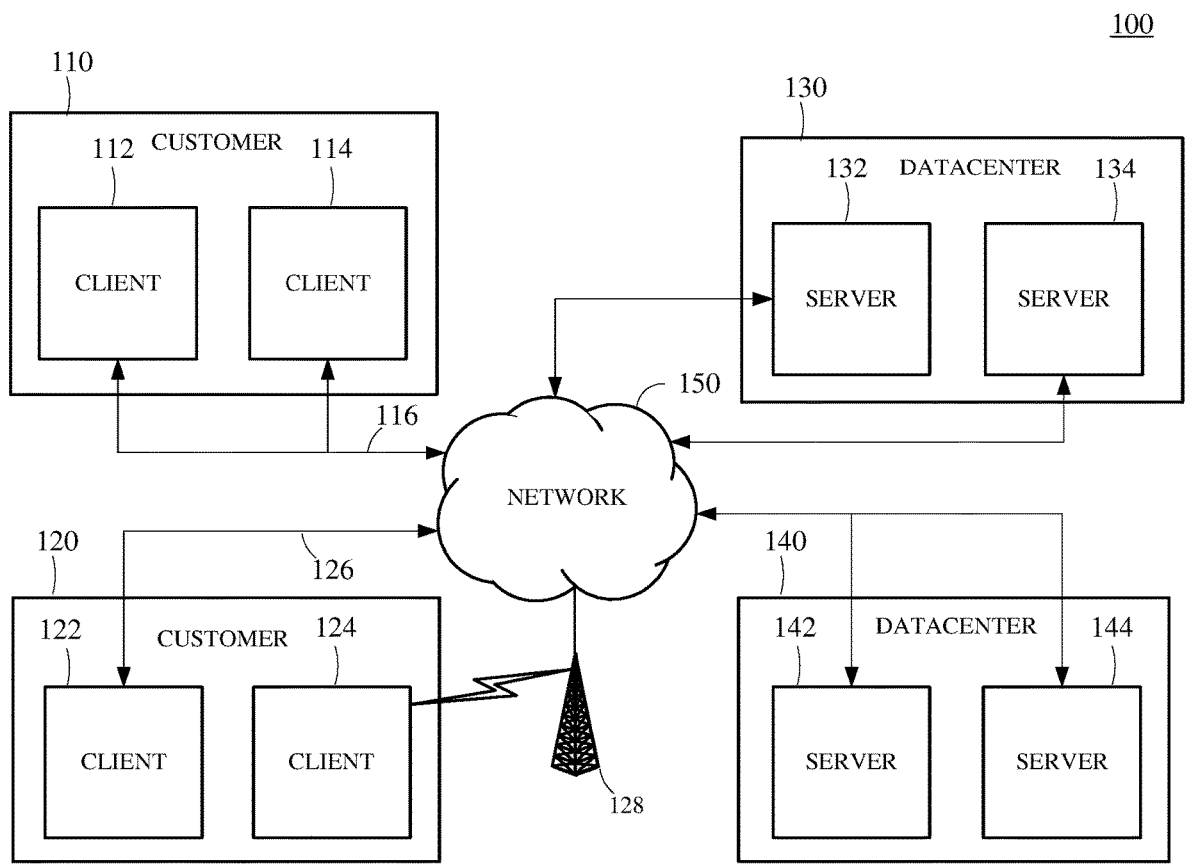
FIG. 1 is a diagram of an example of an electronic computing and communication system in accordance with this disclosure.

FIG. 1 is a diagram of an example of an electronic computing and communication system 100 in accordance with this disclosure. As used herein, the term 'electronic computing and communication system', or variations thereof, may be, or include, a distributed computing system, such as a client-server computing system, a cloud computing system, a clustered computing system, or the like.

An electronic computing and communication system 100 can include customers, such as customers 110 and 120. A customer may have clients, such as clients 112, 114 for customer 110 and clients 122, 124 for customer 120. A client 112/114/122/124 may be a computing system, which may include one or more computing devices, such as a mobile phone, a tablet computer, a laptop computer, a notebook computer, a desktop computer, or any other computing device, or combination of computing devices. In some embodiments, client be implemented as a single physical unit, or a combination of physical units. In some embodiments, a single physical unit may include multiple clients. For example, a client 112/114/122/124 may be an instance of an application or program running on a customer device. Although two customers 110/120, each having two clients 112/114/122/124, are shown in FIG. 1, an electronic computing and communication system may include any number of customers or clients or may have a different configuration of customers or clients. For example, there may be hundreds or thousands of customers and each customer may have any number of clients. Although not shown separately in FIG. 1, a customer 110/120 may include a customer network or domain. For example, the clients 112/114 of a customer 110, may be within a customer network or domain.

The electronic computing and communication system 100 can include one or more datacenters, such as the two datacenters 130/140 shown. A datacenter may include servers, such as the two servers 132/134 shown for datacenter 130, or the two servers 142/144 shown for bottom datacenter 140. A datacenter 130/140 may represent a geographic location, which may include a facility, where servers are located. A server 132/134/142/144 may be a computing system, which may include one or more computing devices, such as a desktop computer, a server computer, or any other computer capable of operating as a server. Although two datacenters 130/140, each including two servers 132/134/142/144 are shown in FIG. 1, an electronic computing and communication system may have any number of datacenters and servers or may have a different configuration of datacenters and servers. For example, there may be tens of data centers and each data center may have hundreds or any number of servers. Although not shown expressly in FIG. 1, each datacenter 130/140 may correspond with one or more datacenter networks or domains, which may be domains other than the client domain.

Clients 112/114/122/124 and servers 132/13/142/144 may be configured to connect to, or communicate via, a network 150. In some implementations, the clients 112/114 of a customer 110 may connect to the network 150 via a communal connection point, link, or path 116. In some implementations, one or more clients 122/124 of a customer 120 may connect to, or communicate via, the network 150 using distinct connection points, links, or paths 126/128. A connection point, link, or path may be wired, as shown by links 116/126, wireless, as shown by connection point 128, or may include a combination of wired and wireless mediums.

The network 150 can, for example, be the Internet. In some embodiments, the network 150 may be, or include, a local area network (LAN), a wide area network (WAN), a virtual private network (VPN), or any other means of electronic computer communication capable of transferring data between any of clients 112/114/122/124 and servers 132/134/142/144. The network 150, the datacenters 130/

140, or any other element, or combination of elements, of the electronic computing and communication system 100 may include network hardware such as routers, switches, load balancers, other network devices, or combinations thereof. For example, each of datacenters 130/140 may include one or more load balancers for routing traffic from network 150 to various servers, such as servers 132/134/142/144.

Other implementations of the electronic computing and communication system may be used. For example, devices other than the clients 112/114/122/124 and servers 132/134/142/144 shown may be included in the electronic computing and communication system 100. In an implementation, one or more additional servers may operate as an electronic computing and communication system infrastructure control, from which servers, clients, or both, may be monitored, controlled, configured, or a combination thereof. For example, some or all of the techniques described herein may operate on the electronic computing and communication system servers.

In some embodiments, one or more of the elements of the electronic computing and communication system 100, such as the clients 112/114/122/124 or the servers 132/134/142/144, may be configured to store, manage, and provide one or more databases, tables, or other information sources, or a portion thereof, such as a configuration management database (CMDB), a management information base (MIB), or a combination thereof. A configuration management database may include records representing one or more entities, devices, or units of the electronic computing and communication system, such as the clients 112/114/122/124, the customers 110/120, the datacenters 130/140, the servers 132/134/142/144, the access point 128, the network 150, or any other element, portion of an element, or combination of elements of the electronic computing and communication system 100. The configuration management database may include information describing the configuration, the role, or both, of an element of the electronic computing and communication system 100. In some embodiments, a management information base may include one or more databases listing characteristics of the elements of the electronic computing and communication system 100. In some embodiments, an object identifier (OID) may represent object identifiers of objects or elements in the MIB.

In some embodiments, the techniques and methods described herein, portions thereof, or combinations thereof, may be implemented on a single device, such as a single server, or a combination of devices, such as a combination of clients 112/114/122/124 and servers 132/134/142/144.

Figure 2:
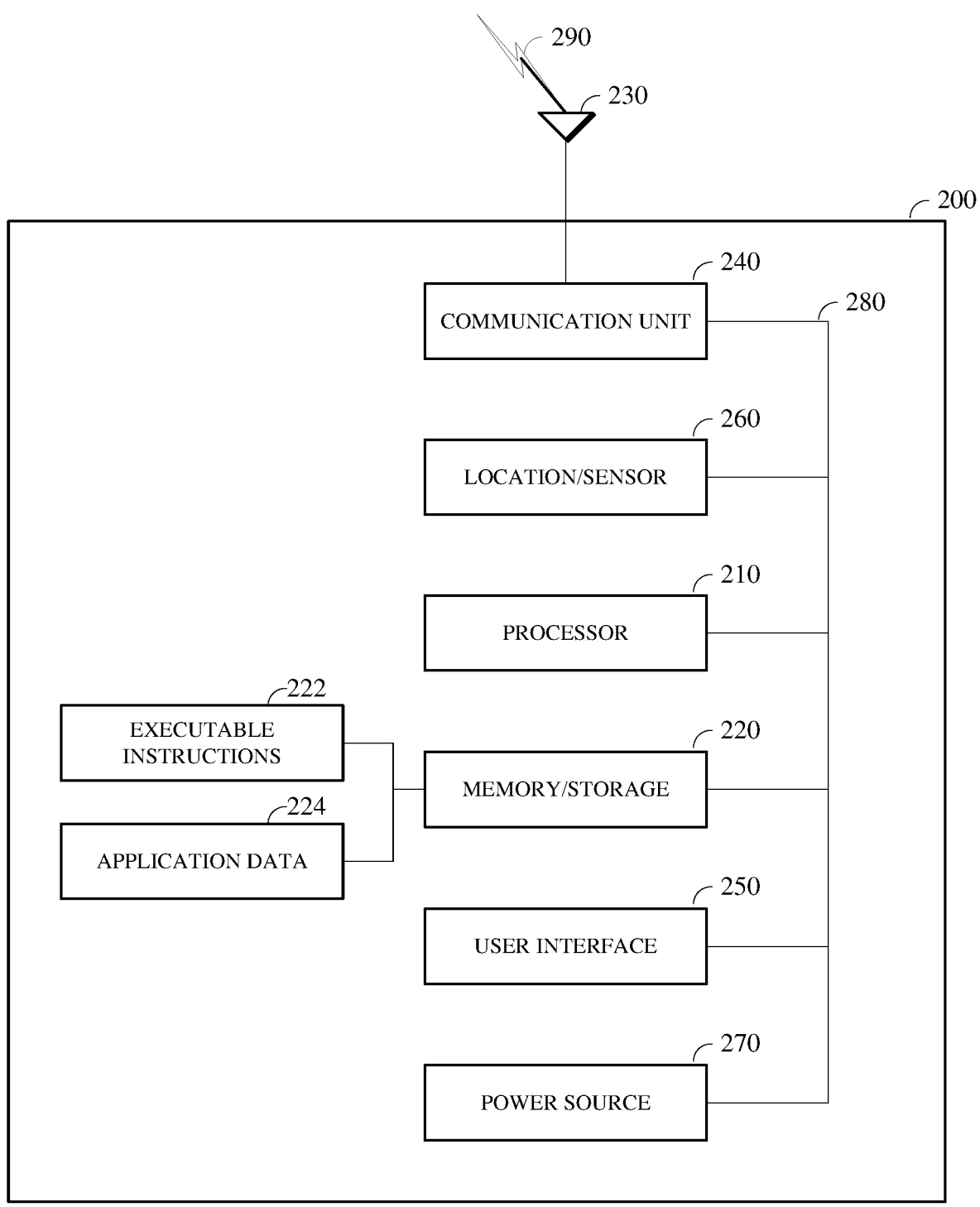
FIG. 2 is a block diagram of an example internal configuration of a computing device in accordance with this disclosure.

FIG. 2 is a block diagram of an example internal configuration of a computing device 200, such as a client 112/114/122/124 or a server 132/134/142/144 of the electronic computing and communication system 100 shown in FIG. 1. As previously described, a client or server may be a computing system including multiple computing devices, or a single computing device, such as a mobile phone, a tablet computer, a laptop computer, a notebook computer, a desktop computer, a server computer, or the like.

A computing device 200 can include components or units, such as a processor 210, memory 220, a network communication unit 230, a network communication interface 240, a user interface 250, a sensor unit 260, a power source 270, a bus 280, or a combination thereof.

The processor 210 can be a central processing unit (CPU), such as a microprocessor, and can include single or multiple processors, each having single or multiple processing cores. The processor 210 can include single or multiple processors each having single or multiple processing cores. Alternatively, the processor 210 can include another type of device, or multiple devices, capable of manipulating or processing information now-existing or hereafter developed. For example, the processor 210 may include multiple processors interconnected in any manner, including hardwired or networked, including wirelessly networked. In some embodiments, the operations of the processor 210 can be distributed across multiple physical devices or units that can be coupled directly or across a local area or other network. In some embodiments, the processor 210 may include, or access, a cache as a form of localized fast memory for operating on data and instructions.

In some embodiments, the memory 220 may include volatile memory, non-volatile memory, or a combination thereof. For example, the memory 220 may include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. In some embodiments, the memory 220 can include another type of device, or multiple devices, capable of storing data or instructions for processing by the processor 210, now-existing or hereafter developed. The processor 210 may access and manipulate data in the memory 220 via the bus 280.

The memory 220 can include executable instructions 222, data, such as application data 224, or a combination thereof, for immediate access by the processor 210. The executable instructions 222 can include, for example, an operating system and one or more application programs, which may be loaded or copied, in whole or in part, from non-volatile memory to volatile memory to be executed by the processor 210. The executable instructions 222 may be organized into programmable modules or algorithms, functional programs, codes, code segments, or combinations thereof, to perform various functions described herein. The operating system can be, for example, Microsoft Windows®, Mac OS X®, Linux®, or an operating system for a small device, such as a smart phone or tablet device, or a large device, such as a mainframe computer. Functional programs can include, for example, a web browser, a web server, a database server, or a combination thereof. The application data 224 can include, for example, user files, database catalogs, and configuration information. The memory 220 may include executable instructions 222, application data 224, or a combination thereof for implementing the techniques described herein. The memory 220 may comprise one or multiple devices and may utilize one or more types of storage, such as solid state or magnetic.

The network communication unit 240 can be coupled to the processor 210 via the bus 280. In some embodiments, network communication unit 240 can comprise one or more transceivers. The network communication unit 240 can, for example, provide a connection or link to a network, such as the network 150 shown in FIG. 1, via the network communication interface 230, which may be a wired network interface, such as Ethernet, or a wireless network interface (as shown). For example, the computing device 200 may communicate with other devices via the network communication unit 240 and the network interface 230 using one or more network protocols, such as Ethernet, TCP/IP, power line communication (PLC), WiFi, infrared, GPRS/GSM, CDMA, or the like.

A user interface 250 can include a display, a positional input device, such as a mouse, touchpad, touchscreen, or the like, a keyboard, or any other human and machine interface devices. The user interface 250 can be coupled to the processor 210 via the bus 280. Other interface devices that permit a user to program or otherwise use the computing device 200 can be provided in addition to or as an alternative to a display. In some embodiments, the user interface 250 may include a display, which may be a liquid crystal display (LCD), a cathode-ray tube (CRT), a light emitting diode (LED) display, such as an OLED display, or the like.

Although a single sensor 260 is shown, a computing device 200 may contain any number of sensors and detectors 260, which may monitor the device 200 itself or the environment around the device 200. For example, a computing device 200 may contain a geospatial location identification unit 260, such as a global positioning system (GPS) location unit. In some embodiments, the power source 270 may be a battery, and the computing device 200 may operate independently of an external power distribution system. Any of the components of the computing device 200, such as the sensor 260 or the power source 270 may communicate with the processor 210 via the bus 280.

Other implementations of the internal architecture of clients and servers may be used. For example, a server may omit the location unit 260. The operations of the processor 210 can be distributed across multiple machines which can be coupled directly or across a local area or other network. The memory 220 can be distributed across multiple machines such as network-based memory or memory in multiple machines performing the operations of clients or servers. Although depicted here as a single bus, the bus 280 can be composed of multiple buses, that may be connected to each other through various bridges, controllers, and/or adapters.

Figure 3:
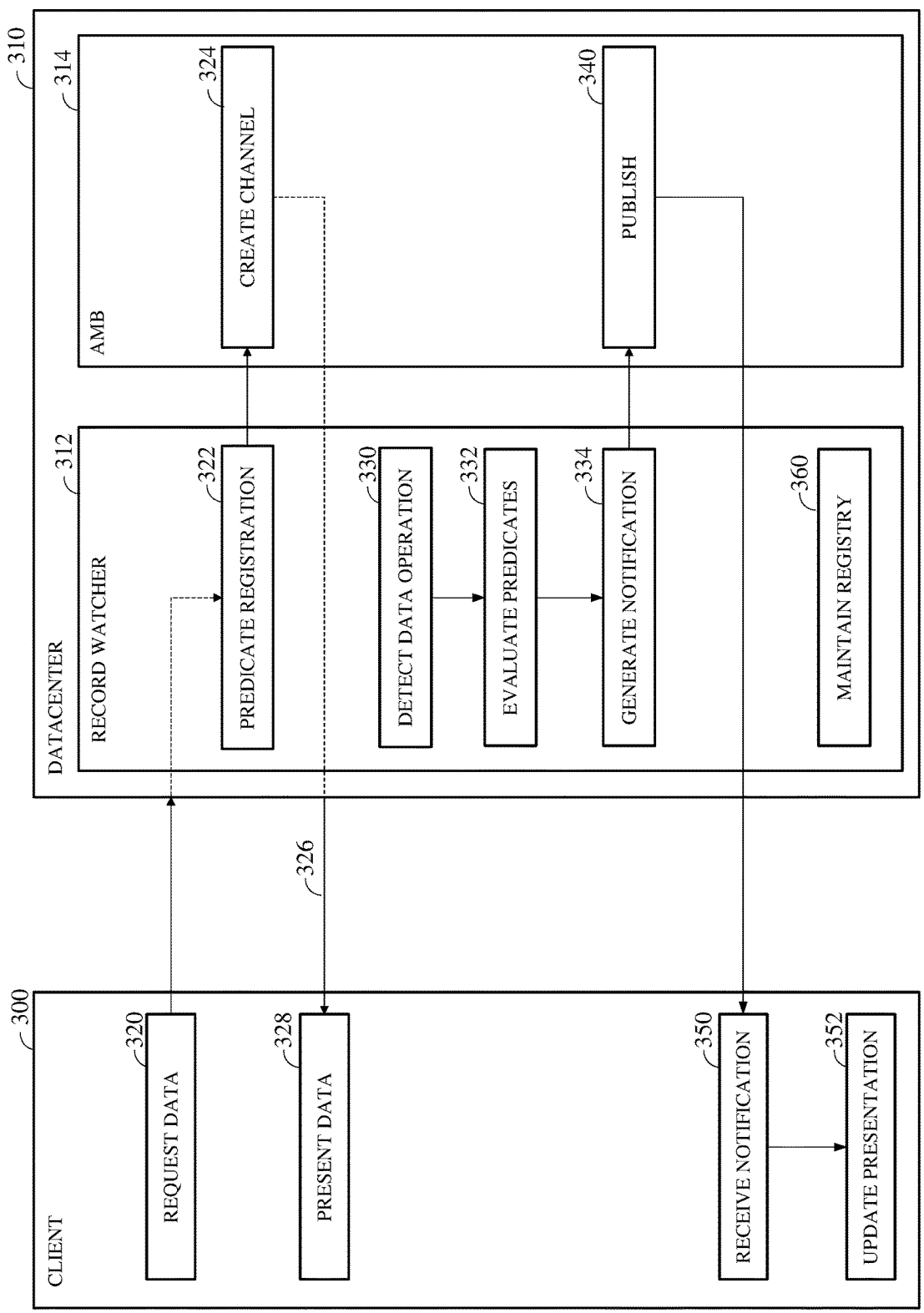
FIG. 3 is a diagram of an example of a method of universal automatic data update detection and publication in accordance with this disclosure.

FIG. 3 is a diagram of an example of a method of universal automatic data update detection and publication in accordance with this disclosure. In some embodiments, universal automatic data update detection and publication may be implemented in an electronic computing and communication system, such as the electronic computing and communication system 100 shown in FIG. 1. For example, portions of universal automatic data update detection and publication may be implemented in a client device 300, such as a client 112/114/122/124 of the electronic computing and communication system 100 shown in FIG. 1; and portions of universal automatic data update detection and publication may be implemented in a datacenter 310, which may include a server, such as the server 132/134/142/144 of the electronic computing and communication system 100 shown in FIG. 1. Although shown as a single unit in FIG. 3, the datacenter 310, may be implemented in a distributed, or clustered, environment, which may include multiple physical or logical devices. In some embodiments, the datacenter 310 may include a record watcher unit 312, an asynchronous message bus (AMB) unit 314, a data storage unit (not show), a web server (not shown), or any other device, or combination of devices, of a datacenter. In some embodiments, the record watcher, the asynchronous message bus, or both, may be distributed, and may run on one or more nodes. In some embodiments, the number of nodes may be adjusted to support continuous user scaling.

In some embodiments, universal automatic data update detection and publication may include requesting data at 320, predicate registration at 322, asynchronous message bus channel creation at 324, data retrieval at 326, data presentation at 328, detecting an incoming data operation at 330, evaluating registered predicates at 332, identifying a predicate match at 334, generating a change notification at 336, publishing the change notification at 340, receiving the change notification at 350, updating the presentation at 352, or a combination thereof.

In some embodiments, universal automatic data update detection and publication may include generating and sending a request for data at 320. For example, the client device 300 may generate and send a request for data, or requested information, to access information from the datacenter 310 via the electronic computing and communication system. For example, a request for requested information may indicate requested information that includes one or more information elements associated with a structured data location in a structured data storage unit. In some embodiments, a user may operate a client device 300 to instantiate an instance of a browser, or other local application, which may request information stored, in whole or in part, at the datacenter 310. The requested information may, for example, be stored at the datacenter 310 in a data storage unit, such as a database.

In some embodiments, universal automatic data update detection and publication may include evaluating structured data or records in a defined sequence or order to identify one or more data elements from the structured data that satisfy or pass a predicate. In some embodiments, a predicate may be an abstraction of a logical condition or statement that may be evaluated, based on the information stored in the database, to a defined result, such as true, false, or unknown. Evaluating may include using a high-order function, such as a filter. The structured data or records may include data stored in or derived from a data storage structure, such as a database. In some embodiments, the evaluation of a predicate may depend on contextual metadata.

In some embodiments, one or more predicates may be registered at 322. In some embodiments, one or more predicates may be registered automatically in response to a request for information as shown in FIG. 3, such as in response to input, which may be user input to instantiate an instance of a browser, or other local application. The requested information may, for example, be stored at the datacenter 310 in a database, or other data storage unit. In some embodiments, the record watcher 312 may receive, intercept, or identify the request for data sent at 320, may automatically identify or generate one or more predicates based on the request for data, and may register the predicates in a predicate registry at 322. For example, the record watcher 312 may identify a predicate reference the structured data location indicated by the data request sent at 320. Although not shown in FIG. 3, in some embodiments, one or more predicates may be registered in response to input, such as user input, defining or specifying the predicates. For example, an application, such as a web browser instantiated on a client device, may present a user interface for generating and registering predicates.

In some embodiments, a predicate may include one or more terms, such as a path term, an operator term, a value term, or a combination thereof. A path term may indicate or reference a structured data location, which may be a location within structured data. For example, the structured data may be stored in a database, which may include tables, which may include columns or fields, and a path term may indicate a field in a table of a database. In some embodiments, a path term may indicate a derivative location, which may be a structured data location derived from a combination of other locations, derived locations, or both. In some embodiments, a path term may be relative within a defined context. An operator term may indicate an operation for evaluating the predicate, such as equals or "in". For example, an operator term may be an arithmetic operator, a relational operator, a logical operator, or any other predicate operator. A value term may indicate one or more values corresponding to the location indicated by the path term. For example, a predicate may include the path term "priority", which may indicate a column or field named "priority" in a database table, such as an "incidents" table, and the predicate may include the values 1, 2, and 3 as the value term, which may indicate values of 1, 2, or 3 stored in, entering, or leaving the field "priority" in the table "incidents".

In some embodiments, the domain of a predicate may include records or values of information elements matching the predicate. For example, the predicate may include a path term that indicates an information element, such as 'priority', an operator term that indicates a relationship, such as 'equals', and a value term that indicates a value, such as one (1), data stored in a data storage unit in a 'priority' field, having the value one (1), may match the predicate and corresponding records may be in the predicate domain, and data stored in a data storage unit in a 'priority' field, having the value two (2), may not match, or may miss, the predicate and corresponding records may not be in the predicate domain.

Figures 4, 5:
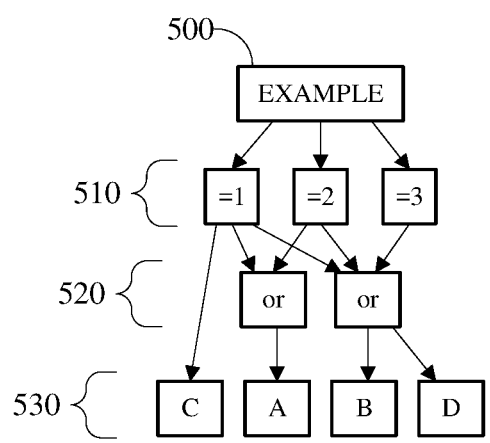
FIG. 4 is a diagram of examples of predicates and actions for universal automatic data update detection and publication in accordance with this disclosure.
FIG. 5 is a diagram of an example intermediate tree structure for predicates and actions for universal automatic data update detection and publication in accordance with this disclosure.

In some embodiments, the record watcher may include a registry of predicates. Each predicate may correspond with one or more records from the database, which may include records entering or leaving the database. In some embodiments, each predicate may be associated with a respective action. An action may indicate a process or function that may be performed in response to the predicate. In some embodiments, the record watcher may evaluate one or more of the registered predicates in response to detecting an impending data operation, such as a database operation, and may generate a message or notification indicating a change if the database information passes or matches the predicate logic. FIG. 4 shows examples of predicates and corresponding actions.

In some embodiments, predicate registration at 322 may include including the predicates in the predicate registry, which may include compiling the predicates. For example, the record watcher may compile the predicates into an intermediate representation, which may have an intermediate representation structure, such as an intermediate tree representation. In some embodiments, the record watcher may unify similar predicates or predicate terms in the registry of predicates, or a portion thereof, which may maximize computational efficiency and minimize memory utilization. A predicate may be similar to another predicate if the predicates are equal or if the predicates include equivalent terms. In some embodiments, unification may be included in compilation. For example, in response to identifying a predicate for registration the record watcher may perform incremental compilation. Incremental compilation may include the unification of the requested predicate with the existing registry, which may include previously compiled predicates in intermediate representation form. Content of the identified predicate corresponding to previously registered and compiled predicate elements, which may be in the intermediate representation, may be unified. Content of the identified predicate differing from the predicates previously registered and compiled to intermediate representation may be compiled into the intermediate representation, and may be included in the intermediate representation structure. FIG. 5 shows a diagram of a representation of an intermediate representation structure.

In some embodiments, the datacenter 310 may include multiple servers, or nodes, such as in a clustered environment, each server may include a record watcher unit 312, an asynchronous message bus unit 314, or both, and the record watcher 312 in one server may replicate predicates across nodes and may maintain record watcher registry consistency across a distributed system, thus providing a federated service.

In some embodiments, an asynchronous message bus channel may be created at 324. For example, the asynchronous message bus unit 314 may create an asynchronous message bus channel representing the predicate registered at 322. In some embodiments, the action corresponding to a registered predicate may be an asynchronous message bus action to publish to a channel corresponding to the predicate. In some embodiments, creating the asynchronous message bus channel at 324 may include subscribing the client, client device, or client instance, 300 that generated the data request at 320 for the asynchronous message bus channel created at 324.

In some embodiments, the datacenter 310 may retrieve the data requested at 320, or a portion thereof, from the data storage unit, and may transmit the requested data, along with any other relevant information, to the client device 300, at 326. In some embodiments, transmitting the requested data at 326 may include transmitting information indicating the asynchronous message bus channel created at 324, as indicated by the broken line portion at 326.

In some embodiments, the client device 300 may receive the requested information and may output a representation of the requested information, or a portion thereof, for presentation or display to a user of the client device 300 at 328. For example, the client device 300 may generate a user interface for display to a user based on the requested information. Although not shown separately in FIG. 3, in some embodiments, subscribing the client to the asynchronous message bus channel created at 324 may be omitted from creating the asynchronous message bus channel, and the client may subscribe to the asynchronous message bus channel created at 324 in response to receiving the data at 328.

In some embodiments, universal automatic data update detection and publication may include identifying or detecting a data operation at 330. For example, the record watcher unit 312 may implement a filter on data operations, such as database operations. In some embodiments, the record watcher unit 312 may detect, as input, information describing an impending or imminent data operation, such as an insert operation, an update operation, or a delete operation at 330. In some embodiments, the recorder watcher may detect metadata corresponding to the impending data operation. In some embodiments, the record watcher may identify the impending data operation, the corresponding metadata, or both, based on information indicating the data operation received from a third party, or generated internally within the data storage unit, which may be a database. Although described herein as impending data operations, in some embodiments, the data operations may be detected in response to the data storage unit performing, or committing, the corresponding data operation. In some embodiments, a data operation may create, delete, alter, or a combination thereof, data records, which may include one or more information elements stored in the data storage unit, one or more information elements generated, determined, or identified based on information elements stored in the data storage unit, or a combination thereof.

In some embodiments, universal automatic data update detection and publication may include evaluating predicates at 332. For example, the record watcher 312 may evaluate one or more of the registered predicates in response to detecting an impending database operation at 330. In some embodiments, the predicate evaluation at 332 may include traversing the intermediate representation structure, which may include using data records corresponding to the data operation detected at 330 as environment to evaluation. In some embodiments, evaluating predicates at 332 may include identifying a change type.

In some embodiments, the record watcher 312 may determine a change type, or predicate domain change type, at 332 based on the data operation identified at 330, a value, or values, of the corresponding data records immediately preceding the data operation, a value, or values, of the corresponding data record immediately following the data operation, or a combination thereof. A change type, such as enter, change, or exit, may indicate a type of change for the data record with respect to the domain of the predicate. A change type of enter may indicate a record entering the domain of a registered predicate. A change type of exit may indicate that a record from the domain of the registered predicate is removed from the domain of the registered predicate. A change type of change may indicate that a record from the domain of the registered predicate is changed or altered. In some embodiments, the change type may differ from the data operation type, which may be insert, update, or delete. For example, a data record may be included in a predicate domain based on an identified match between an element of the predicate and a value of an element of the data record, a data update operation may change the element to a value that does not match, or misses, the predicate, the data record may exit the predicate domain, and the record watcher may indicate a change type of exit.

In some embodiments, each predicate may be logically executed, or evaluated, multiple times, such as twice, to determine the change type. For example, a predicate may be evaluated based on a value of the data record immediately preceding the data operation, which may be referred to herein as the previous value, and based on a value of the corresponding to the data record immediately following, or subsequent to, the data operation, which may be referred to herein as the current value.

In some embodiments, evaluating the change type may include change type algebra. Change type algebra may surround predicate conjunction and disjunction terms, and may eliminate unnecessary predicate term evaluation.

In some embodiments, a predicate may change, or transition, from fail for the previous value, which may indicate that the predicate did not match, or missed, the database record before the change operation, to pass for the current value, which may indicate that the predicate matched the database record after the database operation, and the change type may be identified as enter, which may indicate a record entering the domain of the filter. In some embodiments, a predicate may change, or transition, from pass for the previous value, which may indicate that the predicate matched the database record before the change operation, to fail for the current value, which may indicate that the predicate did not matched, or missed, the database record after the database operation, and the change type may be identified as exit, which may indicate a record exiting the domain of the filter. In some embodiments, a predicate may pass for the previous value and for the current value, and the change type may be identified as change.

In some embodiments, the record watcher evaluation may ignore a data record that matches zero predicates, or, for each predicate that matches a data record at 332, may identify a change type and output, or publish, a message, or asynchronous message bus record at 334.

In some embodiments, universal automatic data update detection and publication may include generating a change notification at 334. For example, the record watcher 312 may generate a change notification at 334. In some embodiments, the change notification may include information identifying the data record associated with the data operation, the content that is changed, a change type, which may specify a change type for the data record with respect to the domain of the predicate, or a combination thereof. In some embodiments, the record watcher 312 may send, or submit, the change notification to the asynchronous message bus unit 314 at 334.

In some embodiments, the asynchronous message bus, which may be message based, may publish change notification messages to one or more channels at 340, which may include routing change notification messages in channels to clients subscribing to the respective channel. In some embodiments, the asynchronous message bus may utilize a distributed queue to ensure that a published message is delivered exactly once to each subscribed client.

In some embodiments, a subscribing client 300 may receive published change notification messages from the asynchronous message bus at 350. In some embodiments, the client device 300 may update currently presented, or displayed, information, such as the information presented at 328, at 352 in response to receiving a published change notification at 350. In some embodiments, the client device 300 may determine whether to, and how to, update the data presentation in response to receiving the published message based on the change type. For example, the change type may be enter, and the client device may update the presentation to include the record indicated by the published message as an additional record. In another example, the change type may be change, and the client device may update the presentation to modify a corresponding element of the presentation to reflect the updated information, which may include indicating that the information is updated. In another example, the change type may be exit, and the client device may update the presentation to omit a previously included corresponding element.

In some embodiments, universal automatic data update detection and publication may include registry maintenance at 360. For example, the record watcher 312 may remove inactive or stale predicates. In some embodiments, the record watcher may maintain a count or cardinality of registered predicates, or predicate elements. In some embodiments, the record watcher may maintain a count or cardinality of asynchronous message bus channel subscription references to registered predicates. In some embodiments, the record watcher may use the cardinality of registered predicates, the cardinality of asynchronous message bus channel subscription references, naïve mark-and-sweep garbage collection, or a combination thereof, to remove or deregister stale predicates or predicate elements from the intermediate representation. In some embodiments, registry maintenance may include periodic maintenance, such as at ten second intervals, event based maintenance, such as in response to receiving maintenance related information, or both.

Although not shown separately in FIG. 3, in some embodiments, the client 300 may transmit registry maintenance information to the record watcher 312. In some embodiments, the client device 300 may cease presenting, or cease updating, the requested data and may send a message to the record watcher 312 indicating the cessation of the presentation. For example, a user may operate a client device 300 to instantiate an instance of a browser, or other local application, which may request information at 320 stored, in whole or in part, at the datacenter 310, the client device 300 may receive and present the requested data at 328 via the browser instance, may receive the published change notification at 350, may update the presentation at 352 via the browser instance, may receive input closing the browser instance, ceasing updating the presentation, navigating the browser instance away from the presented data, or otherwise changing the data domain of the presentation, and may send an indication to the datacenter 310 indicating the cessation of the presentation or unsubscribing from the asynchronous message bus channel. In some embodiments, asynchronous message bus channel may be removed in response to an event, such as the expiration of a timer associated with the asynchronous message bus channel or in response to receiving an indication from a client that a corresponding presentation has ceased, such as based on a browser window closing.

FIG. 4 is a diagram of examples of predicates and actions for universal automatic data update detection and publication in accordance with this disclosure. FIG. 4 shows four example predicate and action pairs 400/410/420/430. For example, a predicate 400/410/420/430 may include a path term, an operator term, and a value term. The path term may, for example, indicate a field in a table in a database. Thus, each of the predicates shown in FIG. 4 may be related to an 'example' field in a table in a database. Although not shown in FIG. 4, a predicate may include multi-part path information, such as a name of a table and a name of a field. For example, a path term indicating an 'example' field in an 'examples' table may be 'examples.example'. A value term may include one or more target or trigger values. For example, a value of 1 stored, or being stored, in the in the field 'example' may match each of the predicates shown, which may trigger Action A, Action B, Action C, and Action D; a value of 2 stored, or being stored, in the in the field 'example' may match the predicates shown at 400/410/430, and may miss the predicate shown at 420, which may trigger Action A, Action B, and Action D; a value of 3 stored, or being stored, in the in the field 'example' may match the predicates shown at 410/430, and may miss the predicates shown at 400/410, which may trigger Action B and Action D; and a value of 4 stored, or being stored, in the in the field 'example' may miss the predicates shown at 400/410/420/430, which may not trigger an action.

FIG. 5 is a diagram of an example intermediate tree structure for the predicates and actions shown in FIG. 4, for universal automatic data update detection and publication in accordance with this disclosure. In an example, each of the predicate and action pairs 400/410/420/430 shown in FIG. 4 may be compiled to an intermediate form as shown in FIG. 5. The path terms may be unified as shown at 500. Each distinct value indicated by the value terms may be unified with like values as shown at 510. Combinations of distinct values indicated by the value terms may be expressed using logical operators as shown at 520. Actions, which may not be unified, may be represented as shown at 530.

All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The embodiments herein may be described in terms of functional block components and various processing operations. Such functional blocks may be realized by any number of hardware and/or software components that perform the specified functions. For example, the described embodiments may employ various integrated circuit components, e.g., memory elements, processing elements, logic elements, look-up tables, and the like, which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method of universal automatic data update detection and publication, the method comprising:
    receiving, at a server, from a client device, a request for requested information, wherein the requested information includes an information element associated with a structured data location in a structured data storage unit;
    transmitting a response to the client device, the response including the requested information for presentation via the client device;
    after transmitting the response to the client device:
    identifying a first predicate referencing the structured data location, wherein the first predicate is associated with a first action;
    including the first predicate in a predicates registry, wherein including the first predicate in the predicates registry comprises unifying the first predicate and at least a second predicate in the predicates registry into an intermediate representation, wherein the intermediate representation comprises the first predicate associated with the first action and a second action associated with the second predicate;
    creating an asynchronous message bus channel corresponding to the first predicate and subscribing the client device to the asynchronous message bus channel after including the predicate in the predicates registry;
    detecting a data operation configured to modify the information element;
    evaluating the intermediate representation in response to detecting the data operation, wherein evaluating the intermediate representation comprises determining whether the first predicate of the intermediate representation matches the data operation based on a value of the information element preceding the data operation and the value of the information element subsequent to the data operation; and
    upon a determination that the first predicate of the intermediate representation matches the data operation:
    determining a change type corresponding to modification of the information element by the data operation;
    generating a change notification including an indication of the change type; and
    publishing the change notification to the asynchronous message bus channel, such that the presentation via the client device is updated in response to the change notification.

2. The method of claim 1, wherein the first predicate includes:
    a path term indicating the structured data location in the structured data storage unit;
    an operator term; and
    a value term.

3. The method of claim 1, wherein including the first predicate in the predicates registry, detecting the data operation, evaluating the intermediate representation, determining the change type, and generating the change notification are performed by a record watcher unit.

4. The method of claim 1, wherein creating the asynchronous message bus channel and publishing the change notification are performed by an asynchronous message bus unit.

5. The method of claim 1, wherein the first action comprises publishing the change notification to the asynchronous message bus channel.

6. The method of claim 1, wherein detecting the data operation comprises intercepting a request to perform the data operation prior to performing the data operation.

7. The method of claim 1, wherein the data operation comprises an insert operation, an update operation, or a delete operation.

8. The method of claim 1, wherein evaluating the intermediate representation comprises traversing a structure of the intermediate representation.

9. The method of claim 1, wherein determining the change type comprises:
 identifying the change type as exit in response to a determination that the first predicate of the intermediate representation matches the value of the information element preceding the data operation and does not match the value of the information element subsequent to the data operation;
 identifying the change type as enter in response to a determination that the first predicate does not match the value of the information element preceding the data operation and matches the value of the information element subsequent to the data operation; and
 identifying the change type as change, in response to a determination that the first predicate matches the value of the information element preceding the data operation and matches the value of the information element subsequent to the data operation.

10. The method of claim 1, wherein evaluating the intermediate representation comprises determining that the first predicate of the intermediate representation matches a value of the information element before the modification of the information element by the data operation and does not match the value of the information element after the modification of the information element by the data operation, and wherein the change type is determined as exit.

11. The method of claim 1, wherein evaluating the intermediate representation comprises determining that the first predicate does not match a value of the information element before the modification of the information element by the data operation and matches the value of the information element after the modification of the information by the data operation, and wherein the change type is determined as enter.

12. A non-transitory computer-readable storage medium, comprising executable instructions that, when executed by a processor, facilitate performance of operations, comprising:
 receiving, at a server, from a client device, a request for requested information, wherein the requested information includes an information element associated with a structured data location in a structured data storage unit;
 transmitting a response to the client device, the response including the requested information for presentation via the client device;
 after transmitting the response to the client device:
 including, in a predicates registry, a first predicate referencing the structured data location, wherein including the first predicate in the predicates registry comprises unifying the first predicate and at least a second predicate in the predicates registry into an intermediate representation, wherein the first predicate is associated with a first action, the second predicate is associated with a second action, and the intermediate representation associates the first predicate with the first action and the second action;
 subscribing the client device to an asynchronous message bus channel after including the first predicate in the predicates registry;
 detecting a data operation for the structured data storage unit, wherein the information element is associated with the data operation;
 evaluating the intermediate representation in response to detecting the data operation, wherein evaluating the intermediate representation comprises determining whether the first predicate of the intermediate representation matches the data operation based on a value of the information element preceding the data operation and the value of the information element subsequent to the data operation; and
 upon a determination that the first predicate of the intermediate representation matches the data operation:
 publishing a change notification to the asynchronous message bus channel, such that the presentation via the client device is updated in response to the change notification.

13. The non-transitory computer-readable storage medium of claim 12, wherein:
 the first predicate comprises:
 a path term indicating the structured data location in the structured data storage unit;
 an operator term; and
 a value term.

14. The non-transitory computer-readable storage medium of claim 13, wherein the operations comprise creating the asynchronous message bus channel corresponding to the first predicate, and wherein the first action comprises publishing the change notification to the asynchronous message bus channel.

15. The non-transitory computer-readable storage medium of claim 12, wherein detecting the data operation comprises intercepting a request to perform the data operation prior to performing the data operation, wherein the data operation comprises an insert operation, an update operation, or a delete operation, and wherein evaluating the intermediate representation comprises:
 determining a change type corresponding to modification of the information element by the data operation; and
 generating the change notification such that the change notification includes an indication of the change type.

16. The non-transitory computer-readable storage medium of claim 15, wherein evaluating the predicates registry comprises determining whether the first predicate matches the data operation based on a value of the information element preceding the data operation and the value of the information element subsequent to the data operation; and
 wherein determining the change type comprises:
 identifying the change type as exit in response to a determination that the first predicate of the intermediate representation matches a value of the information element preceding the data operation and does not match the value of the information element subsequent to the data operation;
 identifying the change type as enter in response to a determination that the first predicate does not match the value of the information element preceding the data operation and matches the value of the information element subsequent to the data operation; and identifying the change type as change, in response to a determination that the first predicate matches the value of the information element preceding the data operation and matches the value of the information element subsequent to the data operation.

\* \* \* \* \*